United States Patent [19]

Dyer

[11] 4,195,753
[45] Apr. 1, 1980

[54] DRY CHEMICAL APPLICATOR

[76] Inventor: Clifford R. Dyer, Greeley, Colo.

[21] Appl. No.: 803,536

[22] Filed: Jun. 6, 1977

[51] Int. Cl.² ............................................. G01F 13/00
[52] U.S. Cl. ...................................... 222/70; 222/233
[58] Field of Search .................. 222/232, 233, 70, 228, 222/231, 245, 247

[56] References Cited

U.S. PATENT DOCUMENTS

| 1,790,425 | 1/1931 | Johnson | 222/232 X |
| 2,011,340 | 8/1935 | Lundy | 222/245 X |
| 2,204,097 | 6/1940 | Montgomery | 222/245 X |
| 2,631,969 | 3/1953 | Klueger | 222/233 X |
| 3,157,313 | 11/1964 | Sarmento | 222/70 |
| 3,566,491 | 3/1971 | Bukey | 222/245 X |

Primary Examiner—Joseph J. Rolla
Assistant Examiner—Frederick R. Handren

[57] ABSTRACT

A Dry Chemical Applicator apparatus, comprising a storage bin hopper adapted to store dry chemicals therein and having a lower dispensing tube, with an operable auger in the tube to deliver such chemicals falling down into the tube in relatively small adjustable predetermined quantities, with the auger operated by a motor controlled by an adjustable timer, and with an operable pivoted hangar shaker bar in the hopper over the auger connected for simultaneous operation with and upon auger operation, for delivery of the dry chemical by the auger for mixing thereof with small grain or ensilage.

1 Claim, 3 Drawing Figures

DRY CHEMICAL APPLICATOR

This invention relates to the agricultural industry, and particularly to the storage of small grains, and corn, and ensilage. A certain dry chemical, such as Loveland Industries' Malathion Grain Powder, or a similar product, to prevent such agricultural product from mildewing while stored, is found to be advantageous to be mixed with such small grain or ensilage, when stored in storage bins or silos or pits, to help prevent mildewing or spoilage of the grain from occurring during storage thereof.

More particularly, this invention is an apparatus to dispense such dry chemical in an adjustable predetermined amount, from a hopper by an auger, either onto a belt, or directly to a storage elevator bucket leg, usually at the rate of about 30 pounds per 1,000 bushels of small grain being stored, for example.

I have developed my apparatus for dispensing such dry chemical in relatively small quantities from a hopper by an auger, and have found that that chemical in the hopper becomes bridged or packed when held in a hopper for any appreciable length of time, due to its inherent constituency and to humidity. Due to the relative small proportion of the dry chemical which is dispensed from the hopper from time to time, in proportion to the number of bushels of grain being treated per hour of the dry chemical from the hopper, the problem is a real one. For example, for a thousand bushels of small grain to be treated in an hour's time, it has been found that usually only about 30 pounds of such dry chemical need be dispensed by the auger from the hopper. That results in the remainder of the dry chemical in the hopper which is not removed therefrom during that time forming into a semi-packed mass, and then, when it is desired to again remove some of the dry chemical by the auger, it has packed together into a semi-solid mass and it is difficult to remove it because it has bridged or will not fall down in the hopper onto the auger.

The rate of delivery or application of the dry chemical out of the hopper is controlled by the auger, which is run by a suitable electric motor, with the motor operation controlled by a conventional timer. The timer is conventionally one having adjustable trippers. That timer effectuates the control of operation of the auger by the turning on and off of the motor, and thus the running of the auger for the desired discharge of the dry chemical by the auger, is in proportion to the size of the auger, and in proportion to the number of trippers used with the timer to control the operation of the motor operating the auger. The more the motor operates, the more the auger will operate to deliver chemicals out of the hopper.

It is therefor a principal object of this invention, in combination with such a hopper having such an auger for delivery of chemicals out of the hopper and with the auger operated by an electric motor controlled by such a timer, to have an operable shaker mechanism within the hopper operable simultaneously with the operation of the auger by the motor to prevent a caking or bridging of the dry chemical in the hopper.

Another object of this invention to provide such a shaker mechanism in the hopper comprising a pivotally mounted movably controlled shaker hanger bar means connected for movement within the hopper by such electric motor.

Another object is to provide such a central operable shaker hanger bar means within the hopper above the auger and having radial arms extending therefrom.

A further object of this invention is to provide such a shaker operable bar means within the hopper having such radial arm extending at right angles and also at acute angles therefrom.

A further object of this invention is to provide such a shaker mechanism operably connected within the hopper above and with the auger, so as to be operable upon auger operation by the electric motor, to prevent a dry chemical powder caking within the hopper, and to thus provide inherent down flow of the dry chemical in the hopper onto the auger, upon auger operation.

The full scope and spirit of this invention will be best understood from the following detailed explanation and from the drawings and the hereunto appended claims. A reference should be made to the drawings, in which like reference numerals have been used to represent like parts, and in which:

Figure 1:
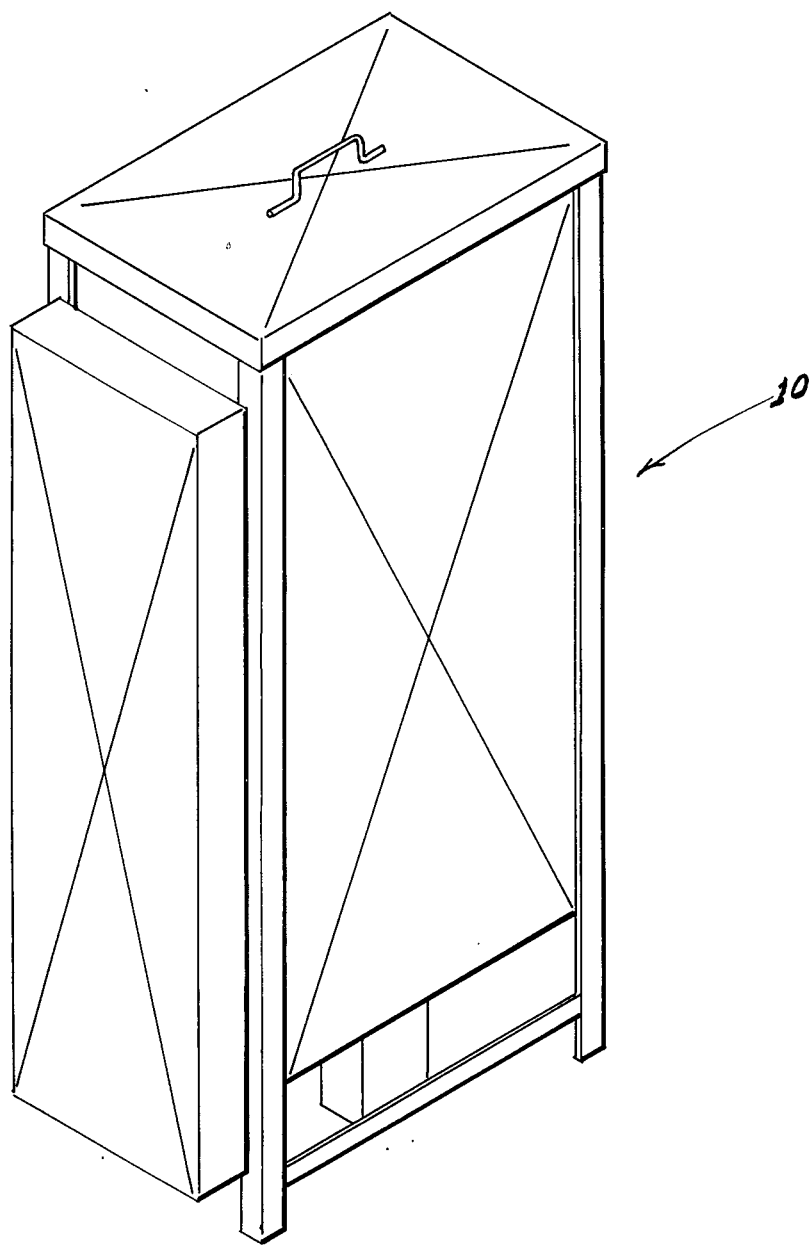
FIG. 1 is an elevational view of my fully enclosed apparatus or machine.
Figure 2:
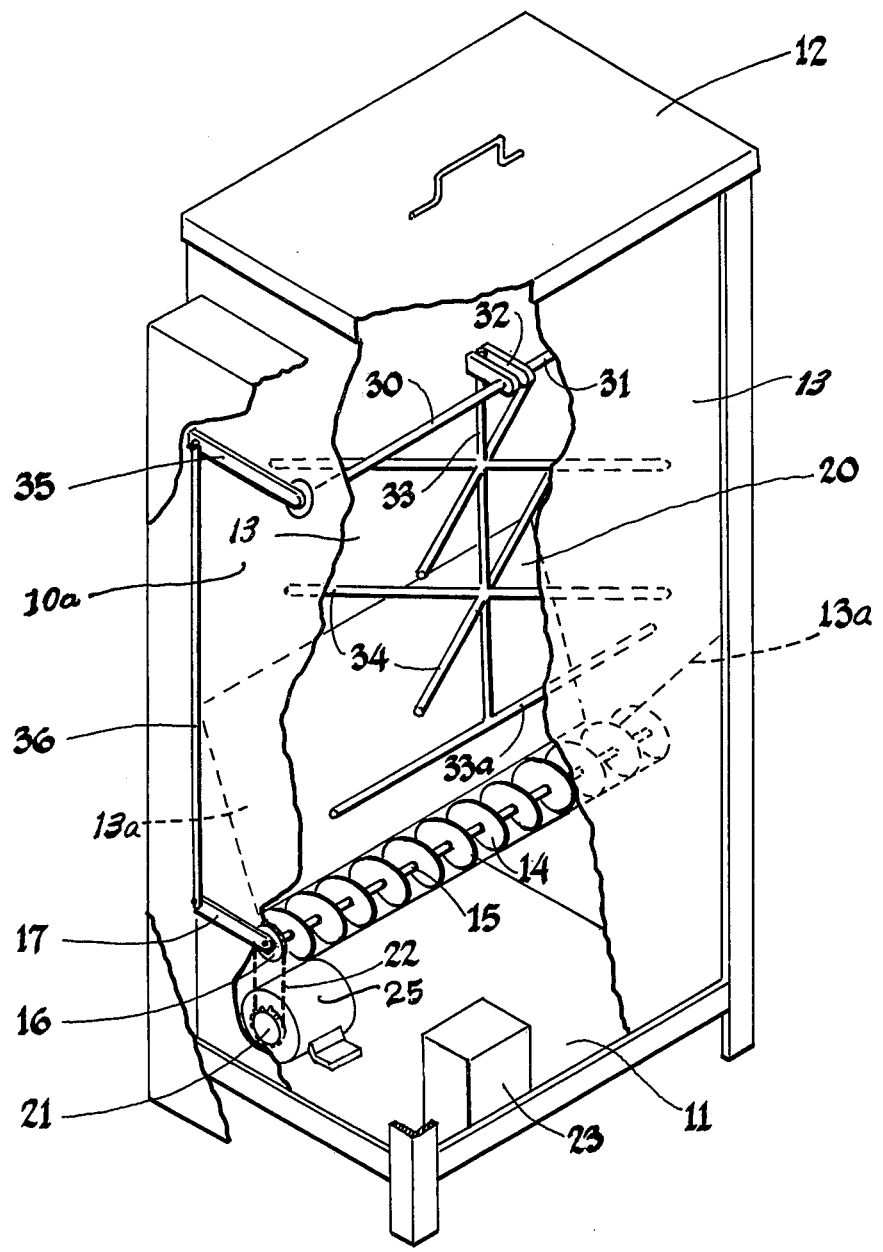
FIG. 2 is a similarly but partially interior broken view to partially show the internal parts thereof.

My apparatus or machine comprises a vertical metal housing 10, having four vertical angle iron corner posts supporting the housing, and a lower floor 11 and with main side walls 10a. The top of the housing is open, and a removable lid 12 is frictionally provided and held thereover. Within the unit, about halfway down from the top, opposing side walls 13 are brought together by a slanting pair of artificial floor pieces 13a converging towards each other there, for reason to be explained.

Below the lower edges an auger channel tube 14 is formed within the unit. The auger tube 14 extends outwardly beyond the far side wall 10a of the housing, as viewed. An operable auger 15 is journalled for rotation within the tube 14 by having its one end journalled in the near wall 10a, as viewed, and is operable by a drive chain 22 over a sprocket 16 keyed on the shaft of the auger outside of that near wall 10a.

A short stub crank 17 is keyed onto the shaft of the auger 15 outside of that wall 10a, so as to turn with that auger shaft.

A totally enclosed fan-cooled electric approximate six revolutions per minute gear motor 25 is mounted on the main floor 11 of the housing, with a drive chain sprocket 21 keyed on its drive shaft, so as to operate the auger by means of a chain 22. The chain 22 loops over drive motor sprocket 21 and is meshed over and drives auger sprocket driven wheel 16 and thus the auger is operated by that motor. A conventional timer adjustable mechanism 23 is connected to the motor 25 to control the period of operation of the motor, for delivery of dry chemical out of the hopper by the auger driven by the motor.

The auger 15 thus controls delivery of the dry chemical, which falls down into the auger tube 14 around and on the auger 15. The hopper when full holds enough dry chemical for normally protecting several thousand bushels of small grain, by the auger dispensing the dry chemicals accurately, requiring only a turning off of the motor when necessary to add such dry chemicals into the hopper when the hopper becomes depleted of chemicals. The six RPM motor by this unit can accurately dispense from 1 and ½ pounds to 180 pounds per hour of the chemicals, being regulated conventionally by a placing of trippers on the conventional timer. It has been determined that one tripper will regulate the motor to drive the auger to dispense 1 and ½ to 3 pounds of dry chemicals, per hour, with such chemicals being of such as Loveland Industries' Malathion Grain Powder or a similar chemical to be applied to small grain. The recommended use of 6% of such chemicals is at the rate of 10 pounds per 1,000 bushels of such grain to be treated, and to accomplish that by my applicator machine I install one tripper in the timer for each 150 bushels to be treated per hour, with the trippers placed conventionally evenly around the dial of the conventional timer.

I provide a special dry chemical anti-bridging or shaker mechanism, indicated generally as 30, within the hopper 10. That shaker mechanism comprises a horizontal rockable bar 31 suitably journalled for rotation into opposite side walls 10a of the housing and centrally thereof above the auger. Centrally of the rocker bar 31 I provide a pair of parallel extended crank arms 32, radially from 31, as shown. Pivotally extended from the outer ends of parallel arms 31, I mount the upper end of an inverted shaker T bar 33, so that 33 hangs pivotally therefrom and with its cross bar 33A extending just above and in proximity parallel with the auger in the lower part of the hopper. Above the cross bar 33a of the shaker, I secure a pair of horizontally spaced X-radial bars 34 secured to the leg of the inverted T 33, as shown. On the outer end of the rockable shaft 31, outside of the inner wall 10a of the hopper, I secure a relatively long crank arm 35 to that rockable bar 31. The crank 35 is to be noted as several times longer than the stub crank 17 on the auger bar. Stub crank 17 is likewise secured outside of the wall 10a to the shaft of the auger 15 so that 17 rotates with that shaft of the auger. A connecting rod 36 is pivotally connected at each of the outer ends of 17 and 35.

Figure 3:
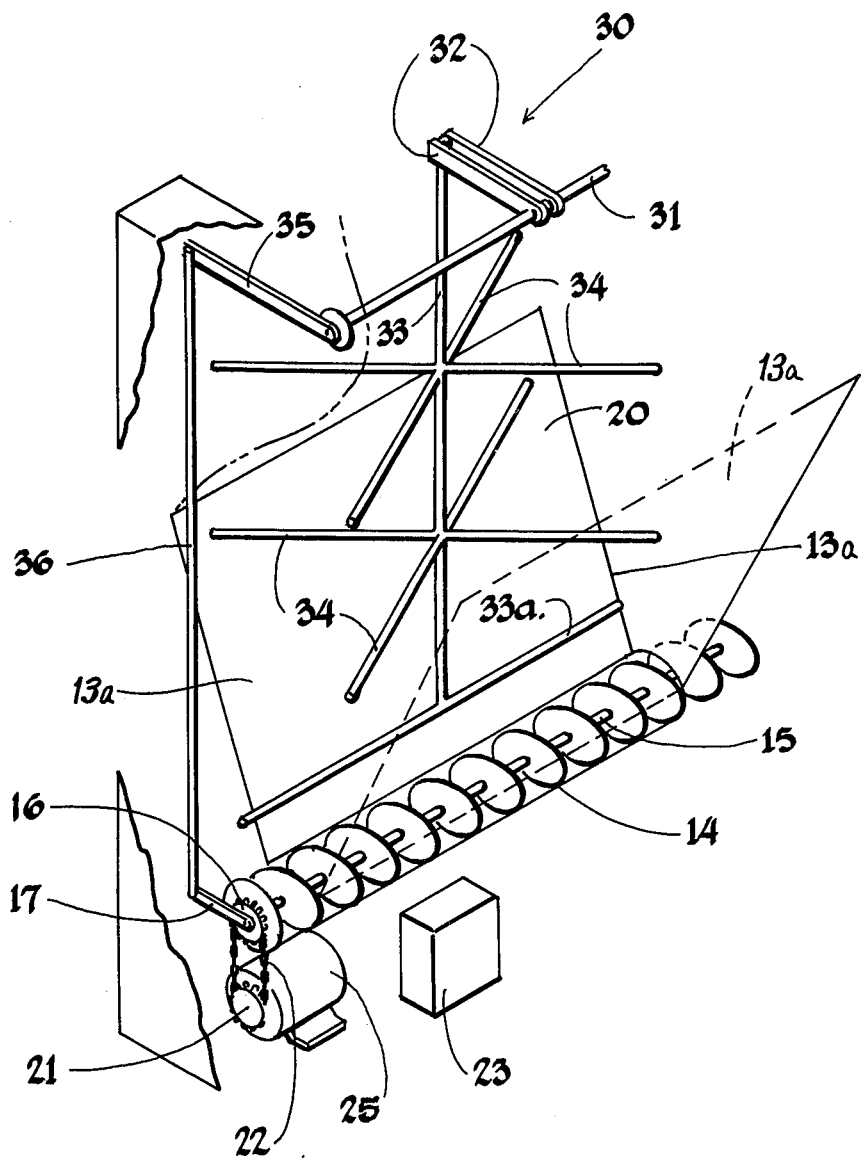
FIG. 3 is a diagrammatical broken view of my machine, showing the inner construction, by the broken line at the right lower side of the sloping hopper.

The operation of my machine will be understood from the foregoing construction. It will be seen that as the motor 25 rotates the crank 17, and the motor will rotate the auger shaft and cause the auger 15 to deliver dry chemical out of the hopper or to the right and out of the tube 14 as viewed in FIG. 3. With each such revolution of auger 15, 17 will also thereby be rotated, and due to the radius of 17 on its axis of 15 being less than the radius of 35 on its axis of 31, there will thereupon be a raising and lowering, by connecting bar 36, of my novel anti-bridging shaker unit 30 as a pendulum within the hopper, caused by a partial rotation of bar 31 by bar 36 upon that rotation of 17. That shaker unit comprises elements 33-33a-34-34-34-34 hanging as a pendulum at the end of the crank 32 within the hopper 10. Thus, upon a raising and lowering of shaker 30 caused thereof by a rocking of the rocker 31, just explained, the dry chemical around the shaker unit 30 will be frictionally moved, shaken, or anti-bridged each time the crank 35 is raised and lowered on its axis of 31, by such vertical movement of shaker 30 in the hopper keeping the dry chemical in a loosened condition. The operation of the auger 15, to deliver dry chemical out of the end of the auger tube 14, or to the right as viewed, is commensurate with the timer 23 setting, as explained, as a result of the operation of the motor 25 as explained, turning of the auger 15. With each such turning of the auger 15, and the turning of its crank 17, that simultaneous movement of 17 causes the movement through connecting rod 36 and crank arm 35 and rotation of shaft 31, and crank 32 thus causes an upper and downward movement or rocking by its shaft 31 of the shaker unit 30, as heretofore explained, within the hopper. The chemical in the hopper 10 will be automatically kept loose and prevented from bridging by that movement of the bars 33a, 34—34, each time the auger operates. That movement of the bars 33a and 34—34, up and down on the dry chemical mass, keeps the dry chemical from so-called bridging or caking into a semi-solid mass, and thus permits that mass to flow or fall down, as is necessary, within the hopper 10 onto the auger 15, during auger operation.

That construction, just explained of the stub crank 17 keyed to auger shaft 15, the rotatable rocker bar 31 with its elongated stub crank 32 carrying the pivoted inverted T shaker unit 33-33a-34-34, hung from the end of 32 as a pendulum, and the larger stub crank 35 keyed to the end of the rockably shaft 31, with the connecting bar 36 connecting the ends of the crank 17 and 35, all together comprise a pendulum-rockable-operable shaker means within the housing, connected to and operable simultaneously upon operation of and by the auger delivering dry chemical from the hopper, for simultaneously effecting a shaking or anti-bridging of the dry chemical within the hopper at the same time as delivery of the chemical is accomplished from the hopper by the auger.

Having thus explained a preferred embodiment of my invention, it will be obvious to those skilled in the art that many changes and modifications can be made therein without deviating from the spirit, scope and teaching of my invention; and, therefore, I wish it to be bound only by the hereunto appended claims.

What I claim and desire to secure by Letters Patent is:

1. A dry chemical applicator comprising: a housing which comprises a frame, a hopper carried by said frame and having front, rear, and two side walls, said front and rear walls converging downwardly into a lower auger tube, and a floor below said tube; an auger disposed in said tube and journalled at either end thereof in said side walls; an electric motor on said floor and disposed adjacent one end of said auger; means operably connecting said motor and said auger; an adjustable timer operably connected with said motor and adapted to control the period of operation of said motor for thereby controlling operation of said auger; shaker means located within said hopper, said shaker means comprising crank means rotatably mounted on said one end of said auger, a rocker bar disposed at the upper end of said hopper in the same vertical plane as said auger and journalled in said side walls, crank means fixed to the end of said rocker bar corresponding to said one end of said auger, said last mentioned crank means being substantially longer than said first mentioned crank means, a connecting rod rotatably mounted at either end to the free ends of both of said crank means, a pair of parallel crank arms centrally located on said rocker bar and fixed thereon to extend radially generally horizontally therefrom, and an inverted T bar pivotally mounted on said parellel crank arms and extending downwardly therefrom to terminate above and in proximity with said auger and parallel thereto; whereby the rotation of said auger by said motor causes said first mentioned crank means to rotate coaxially with said auger thereby causing the lower end of said connecting rod to revolve around the axis of said auger at a radius equal to the length of said first mentioned crank means, creating essentially reciprocating motion at the upper end of said connecting rod, the free end of said last mentioned crank means then moving forwardly and rearwardly in a partial arc causing said rocker bar to rock and, through said parallel crank arms, causing said inverted T bar to move concurrently upwardly-downwardly and in a forward-rearward pendulum arc.

* * * * *

UNITED STATES PATENT OFFICE
CERTIFICATE OF CORRECTION

Patent No. 4,195,753          Dated April 1, 1980

Inventor(s) Clifford R. Dyer

It is certified that error appears in the above-identified patent and that said Letters Patent are hereby corrected as shown below:

On the title page the following should be added:

-- [73]   Assignee: Dyerco Fabricators, Inc.
                    Greeley, Colorado --.

Show WILBUR A. E. MITCHELL as Attorney

In column 3, line 24, "31" should be --32--

Column 4, line 19, "rockably" should be --rockable--

Signed and Sealed this

Fifteenth Day of July 1980

[SEAL]

Attest:

SIDNEY A. DIAMOND

Attesting Officer   Commissioner of Patents and Trademarks